United States Patent [19]

Negi et al.

[11] 4,410,984
[45] Oct. 18, 1983

[54] DIAGNOSTIC TESTING OF THE DATA PATH IN A MICROPROGRAMMED DATA PROCESSOR

[75] Inventors: Virendra S. Negi, Pepperell; Steven A. Tague, Billerica, both of Mass.

[73] Assignee: Honeywell Information Systems Inc., Waltham, Mass.

[21] Appl. No.: 250,820

[22] Filed: Apr. 3, 1981

[51] Int. Cl.³ .............................................. G06F 11/00
[52] U.S. Cl. ...................................... 371/16; 371/22; 364/200
[58] Field of Search ...................... 371/24, 14, 15, 49, 371/51, 3, 25, 22, 16; 364/200, 900; 235/92 CA; 324/73 R

[56] References Cited

U.S. PATENT DOCUMENTS

| | | | |
|---|---|---|---|
| 3,465,132 | 9/1969 | Crockett et al. | 371/3 |
| 3,491,337 | 1/1970 | Guzak, Jr. et al. | 371/3 |
| 3,518,413 | 6/1970 | Holtey | 364/200 |
| 3,566,093 | 2/1971 | Joyce et al. | 371/51 |
| 3,579,199 | 5/1971 | Anderson et al. | 371/24 |
| 3,784,978 | 1/1974 | Zola | 371/3 |
| 3,831,148 | 8/1974 | Greenwalt et al. | 364/200 |
| 3,846,751 | 11/1974 | Prieto | 371/49 |
| 4,019,033 | 4/1977 | Parmet | 371/51 |
| 4,038,537 | 7/1977 | Cassarino | 371/51 |
| 4,048,481 | 9/1977 | Bailey, Jr. et al. | 364/200 |
| 4,159,534 | 6/1979 | Getson, Jr. et al. | 364/200 |
| 4,195,770 | 4/1980 | Benton et al. | 371/24 |

OTHER PUBLICATIONS

Schaaf, "Automatically Checked Photoelectric Apparatus," IBM Tech. Disclosure Bulletin, vol. 18, No. 12, 5/76.

Primary Examiner—Charles E. Atkinson
Assistant Examiner—Michael R. Fleming
Attorney, Agent, or Firm—George Grayson; Nicholas Prasinos

[57] ABSTRACT

A microprogrammed controlled commercial instruction processor coupled to a common bus executes a diagnostic microprogram to check the data path of the common bus interface registers and their associated internal registers. Decoded bits of a predetermined microword of the diagnostic microprogram generate a signal which transfers a predetermined data word containing a plurality of bytes stored in a first of the internal registers sequentially through the interface registers to a second of the internal registers during one microword cycle. Apparatus generates bad parity for selected bytes. Subsequent microwords compare the contents of the first and second internal registers and verify the detection of the "bad" parity.

19 Claims, 6 Drawing Figures

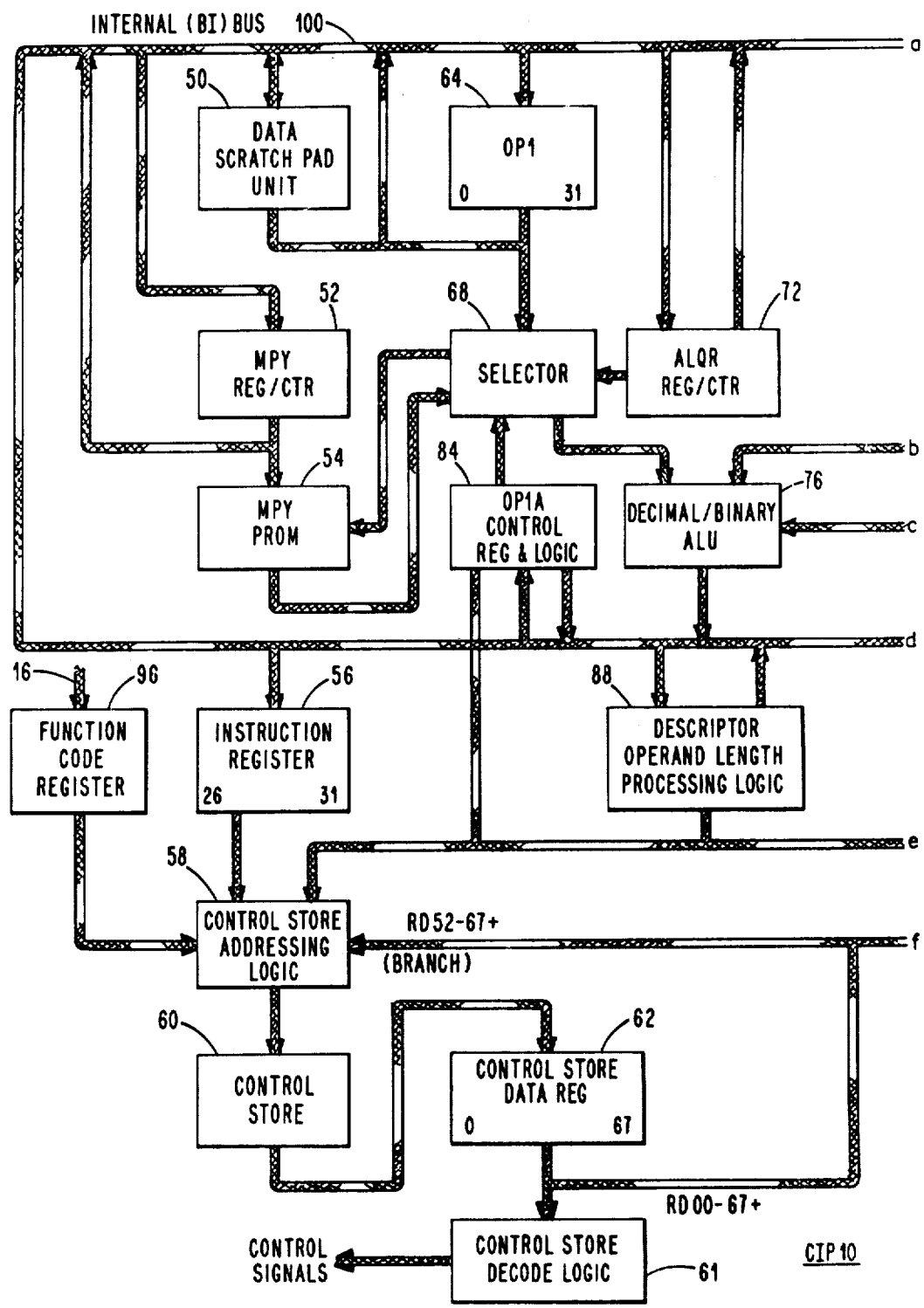
Fig. 2. (sheet 1 of 2)

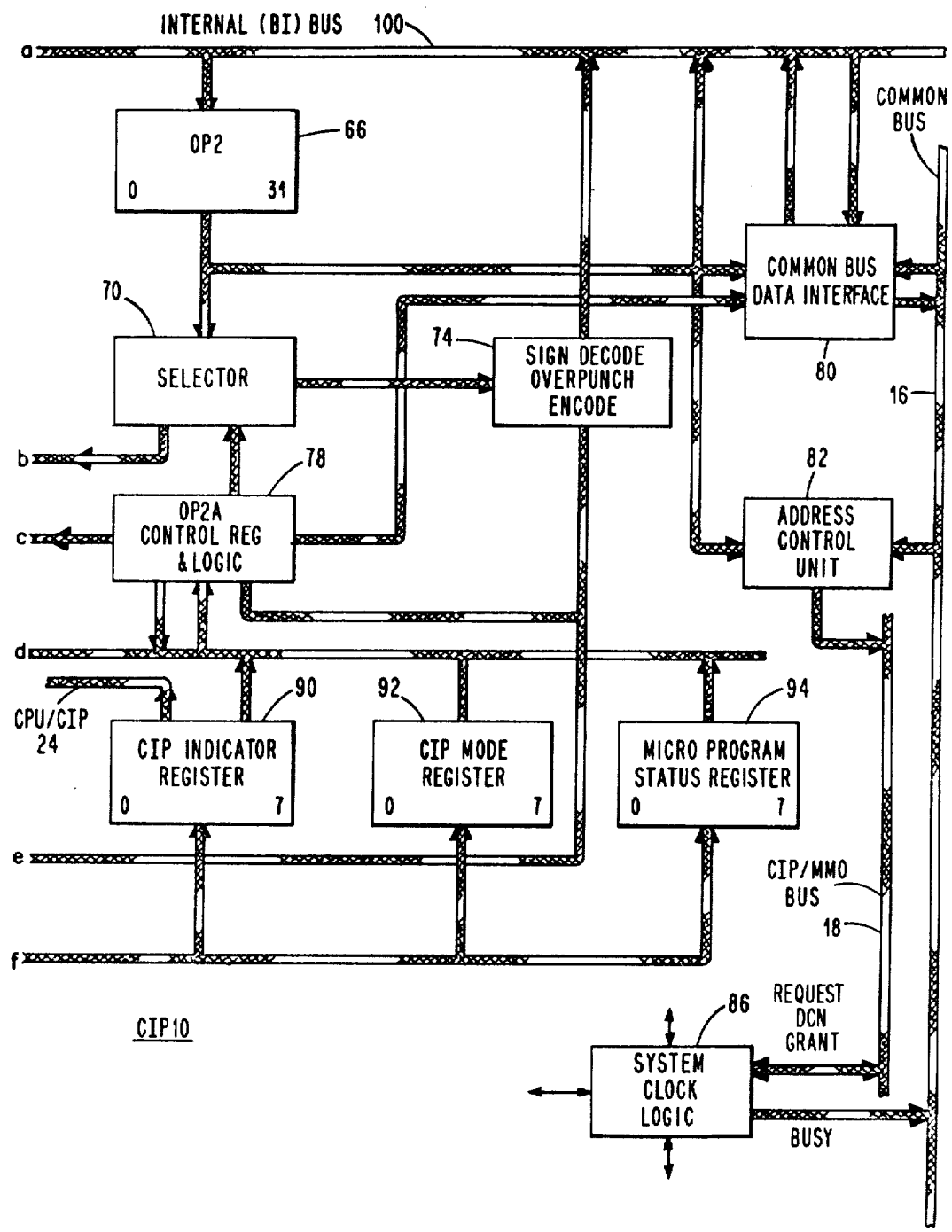
Fig. 2. (sheet 2 of 2)

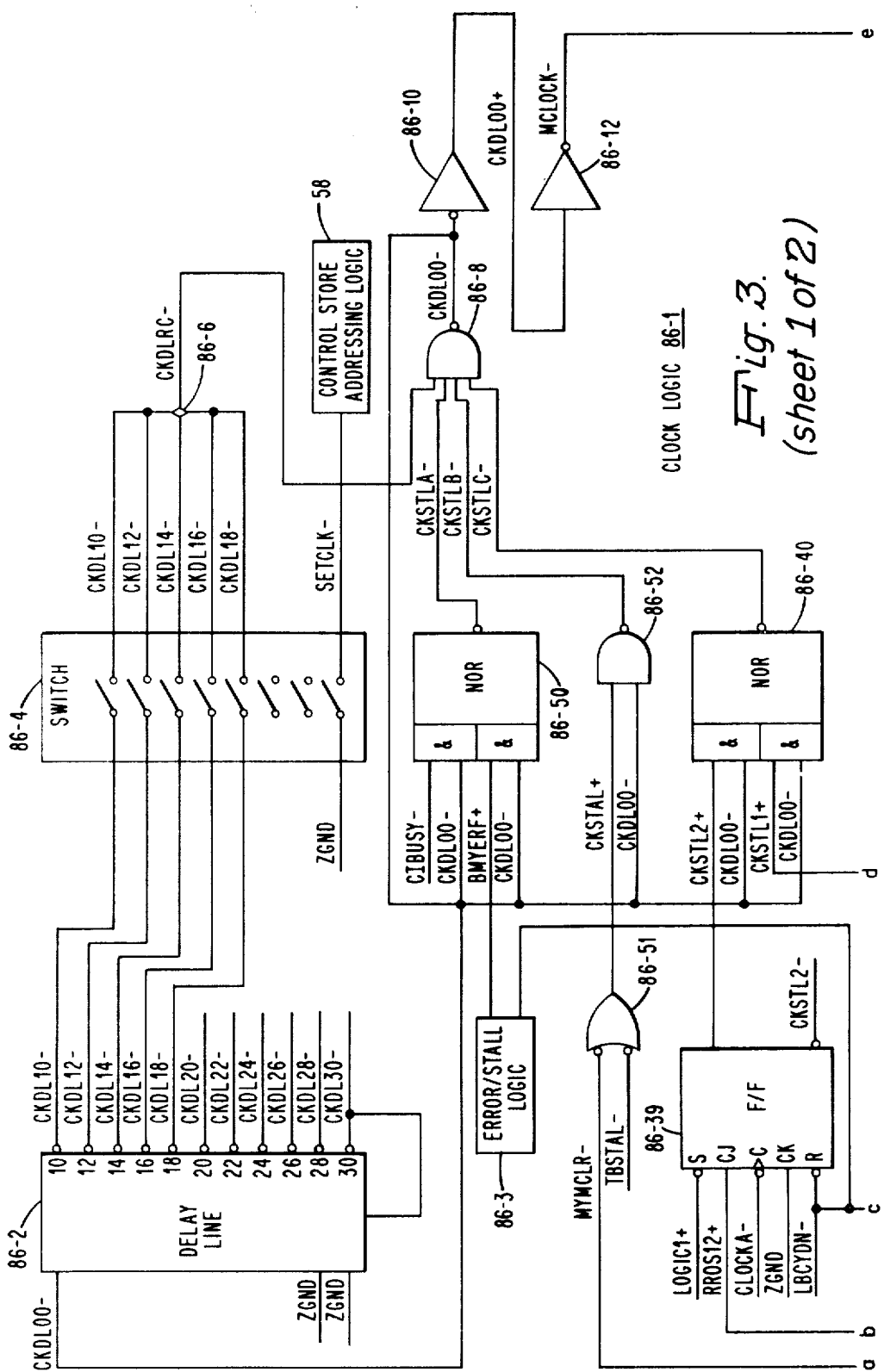
Fig. 3. (sheet 1 of 2)

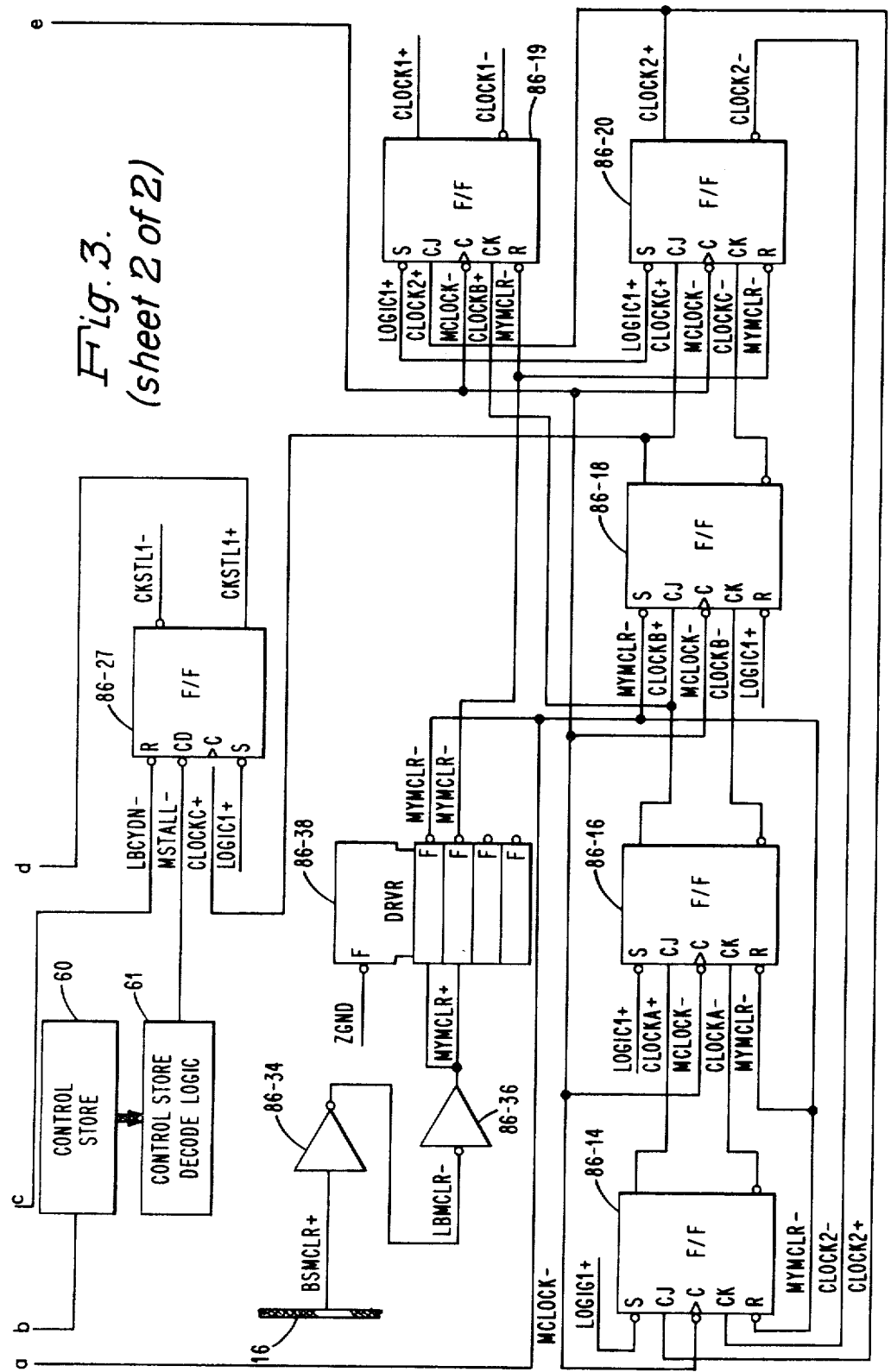
Fig. 3. (sheet 2 of 2)

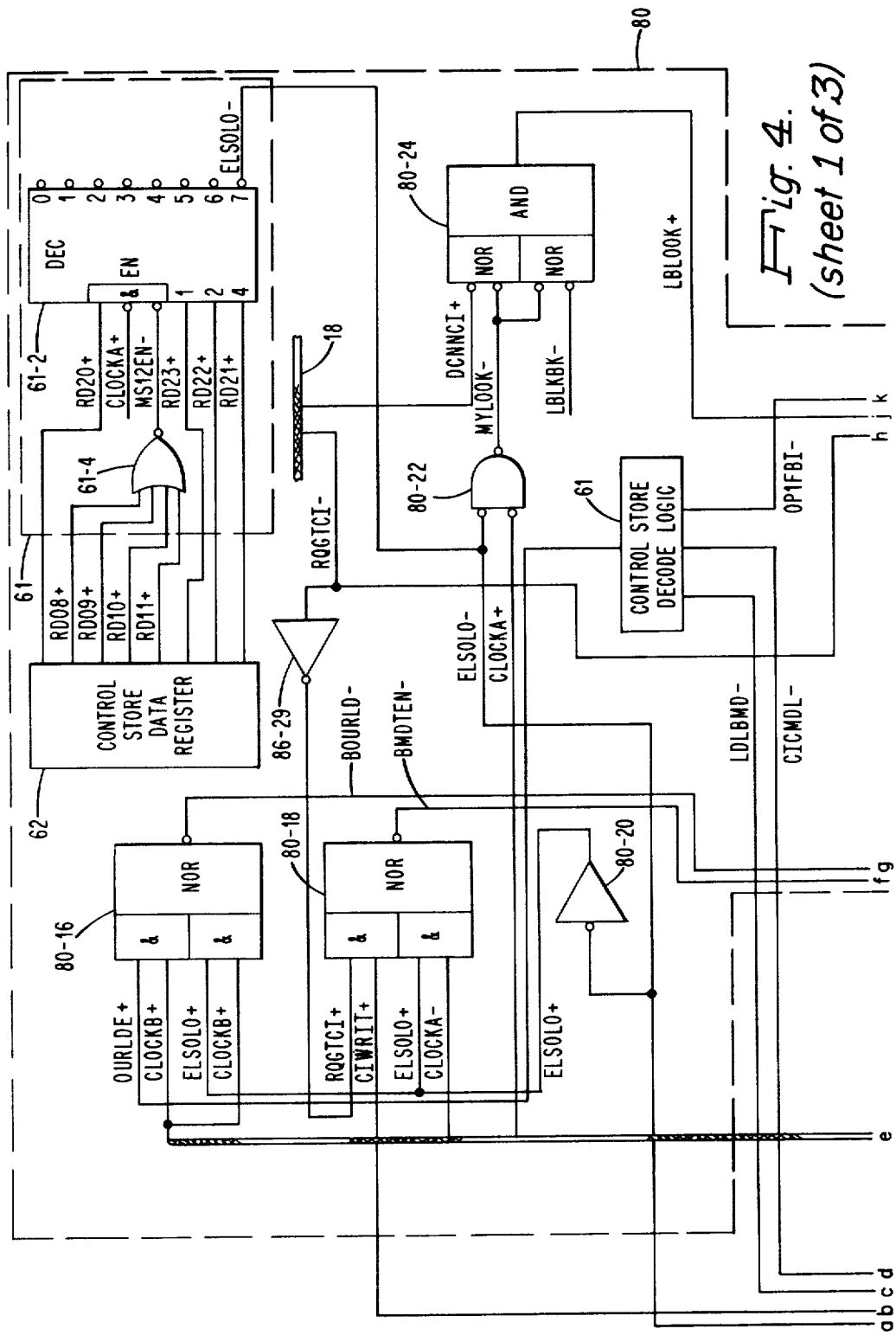
Fig. 4. (sheet 1 of 3)

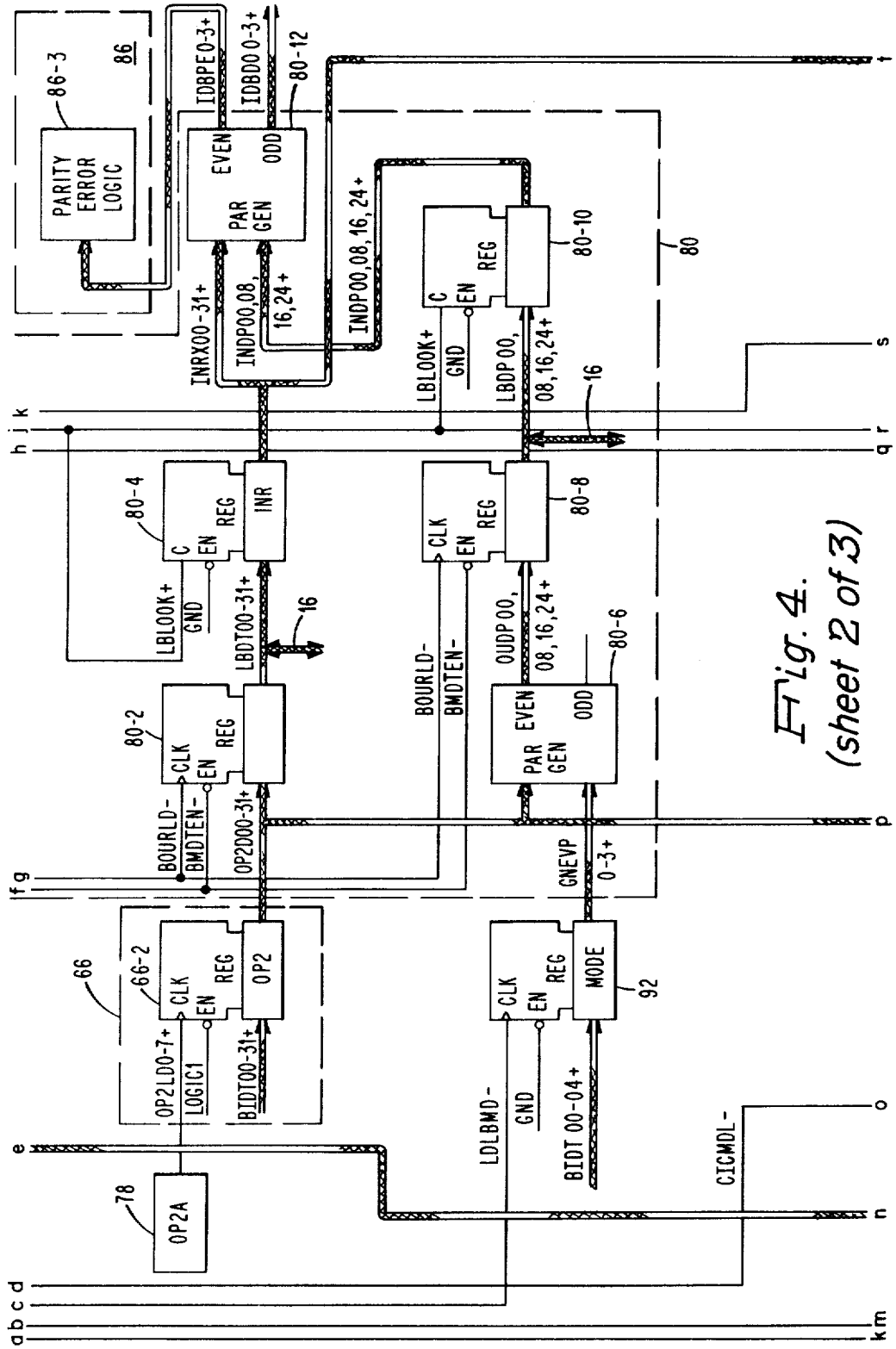
Fig. 4. (sheet 2 of 3)

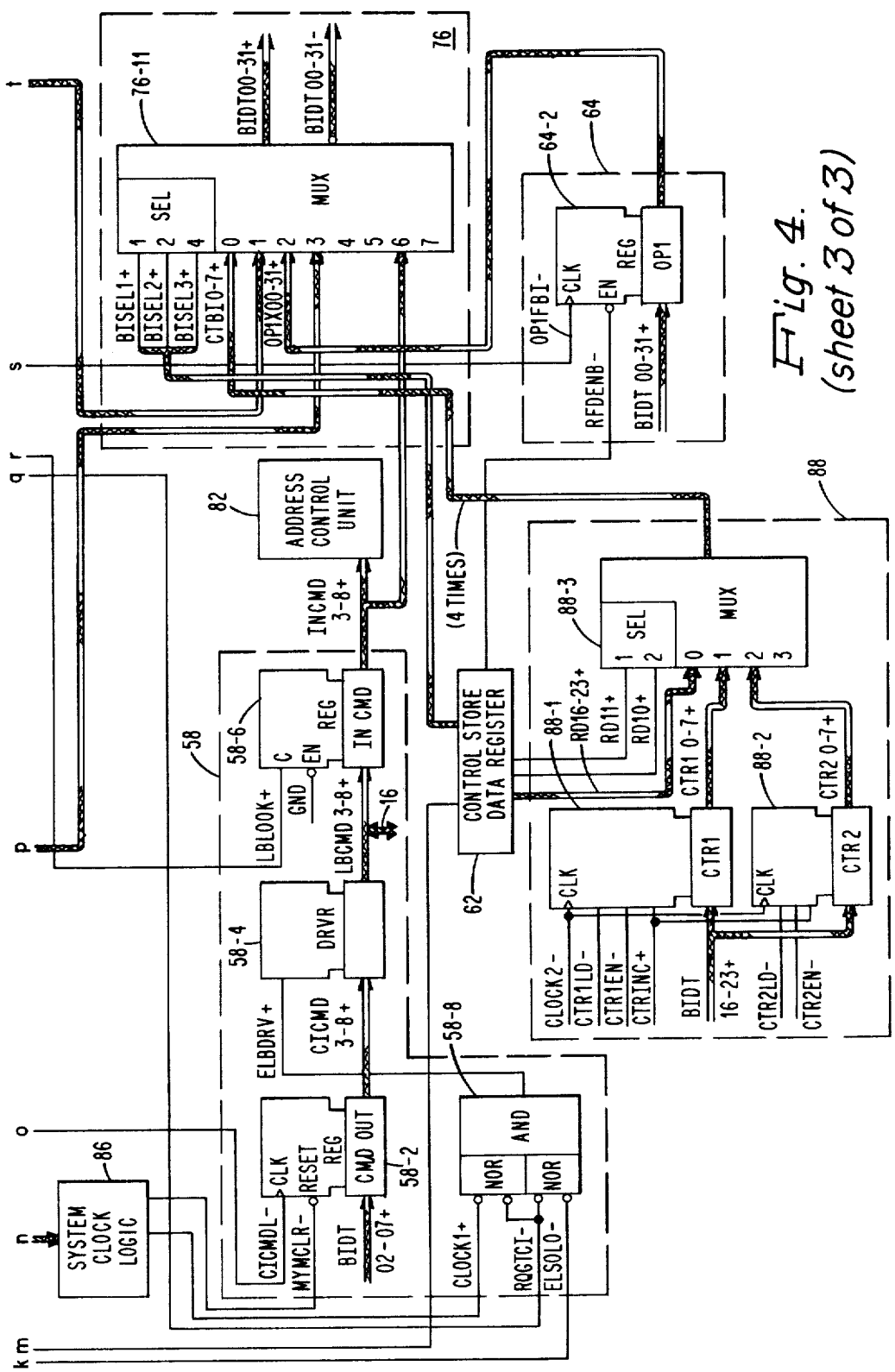
Fig. 4. (sheet 3 of 3)

SWT005
TRANSFER 00₁₆ FROM CTR1 88-1
  TO OP2 REGISTER 66-2 AND
  COMMAND OUT REGISTER 58-2
INCREMENT CTR1 88-1 TO 01₁₆
SET RETURN ADDRESS TO SWT020

SWT010
LOAD MODE REGISTER 92 WITH 10₁₆

SWT015
SIGNAL ELSOLO- FORCED TO
  LOGICAL ZERO, INR 80-4 TO OP1 64-2

ITR340
SET UP ALU 76 TO COMPARE OP1
  REGISTER 64-2 WITH OP2
  REGISTER 66-2
LOAD CTR2 88-2 WITH 03₁₆

ITR345
TEST IF THE BYTE 0 POSITIONS OF
  OP1 REGISTER 64-2 EQUALS OP2
  REGISTER 66-4
INCREMENT OP1A 84 AND OP2A 78
  TO POINT TO THE BYTE 1
  POSITION

ITR350

```
       BYTE
   POSITIONS OP1    NO
   AND OP2 EQUAL  ──────▶ ERROR 1
        ?
       YES
```

ITR355
INCREMENT OP1A 84 AND OP2A 78 BY 2
DECREMENT CTR2 88-2
COMPARE SELECTED BYTE POSITIONS
  OF OP1 AND OP2

```
       CTR2 = 0
          ?
   NO ◀──    ──▶ YES
```

ITR360
INCREMENT CTR2 88-2 TO 00₁₆
DECREMENT OP1A 84 AND OP2A 78 BY 2
RETURN TO SWT020 (SET BY SWT005,
  SWT090) SWT070 (SET BY SWT060)

SWT020

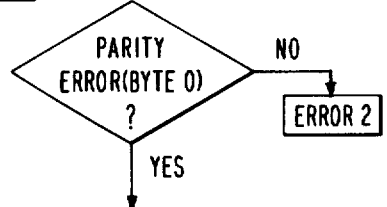

SWT025
SIGNAL ELSOLO-FORCED TO LOGICAL ZERO,
  INR 80-4 TO OP1 64-2

SWT030
LOAD MODE REGISTER 92 WITH 40₁₆

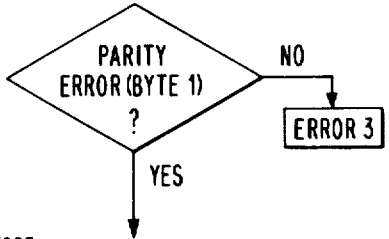

SWT035
SIGNAL ELSOLO-FORCED TO LOGICAL ZERO,
  INR 80-4 TO OP1 64-2

SWT040
LOAD MODE REGISTER 92 WITH 80₁₆

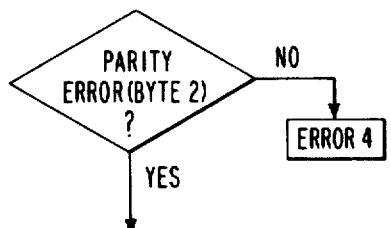

SWT045
SIGNAL ELSOLO-FORCED TO LOGICAL ZERO,
  INR 80-4 TO OP1 64-2

SHORT WRAP TEST

DIAGNOSTIC TESTING OF THE DATA PATH IN A MICROPROGRAMMED DATA PROCESSOR

RELATED APPLICATIONS

The following U.S. patent applications filed on an even date and assigned to the same assignee as the instant application are related to the instant application and are incorporated by reference.

1. "Apparatus for Setting the Basic Clock Timing in a Data Processing System" by Steven A. Tague and Virendra S. Negi, filed on Apr. 3, 1981 and having U.S. Ser. No. 250,823.

2. "A Clock System Having a Stall Capability to Enable Processing of Errors" by Steven A. Tague and Virendra S. Negi, filed on Apr. 3, 1981 and having U.S. Ser. No. 250,810.

The following U.S. patent applications assigned to the same assignee as the instant application are related to the instant application and are incorporated by reference.

3. "A Data Processor Performing a Decimal Multiply Operation Using a Read Only Memory" by Steven A. Tague and Virenda S. Negi, filed on Dec. 24, 1980 and having U.S. Ser. No. 220,218.

4. "A Data Processor Having Units Carry and Tens Carry Apparatus Supporting a Decimal Multiply Operation" by Virendra S. Negi and Steven A. Tague, filed on Dec. 24, 1980 and having U.S. Ser. No. 219,810.

5. "A Data Processor Having Carry Apparatus Supporting a Decimal Divide Operation" by Steven A. Tague and Virendra S. Negi, filed on Dec. 24, 1980 and having U.S. Ser. No. 219,638.

6. "A Data Processor Using Read Only Memories for Optimizing Main Memory Access and Identifying the Starting Position of an Operand" by Steven A. Tague and Virendra S. Negi, filed on Dec. 24, 1980 and having U.S. Ser. No. 219,809.

7. "A Data Processor Having Apparatus for Controlling the Selection of Decimal Digits of an Operand When Executing Decimal Arithmetic Instructions" by Steven A. Tague and Virendra S. Negi, filed on Dec. 24, 1980 and having U.S. Ser. No. 220,220.

8. "A Data Processor Using a Read Only Memory for Selecting a Part of a Register Into Which Data Is Written" by Steven A. Tague and Virendra S. Negi, filed on Dec. 24, 1980 and having U.S. Ser. No. 220,219.

BACKGROUND OF THE INVENTION

1. Field of the Invention

The present invention relates generally to data processing systems and more particularly to apparatus for performing diagnostic testing on a microprogrammed commercial instruction processor.

2. Description of the Prior Art

As the semiconductor industry induces more complex and higher speed logic elements, data processing systems designed using these elements perform more complex logic functions and have higher systems throughout than data processing systems designed in the past. Many of the data processing systems are made up of microprogram controlled subsystems coupled in common to a system bus. Diagnostic testing systems have been developed for such microprogrammed data processing systems to check out each of the subsystems coupled to the system bus from a central source. U.S. Pat. No. 4,159,534 entitled "Firmware/Hardware System for Testing Interface Logic of a Data Processing System" describes a typical diagnostic test. This type of diagnostic test unfortunately makes it difficult to isolate a particular error. It is possible that the error is caused by a malfunction of the central source: the system bus, a subsystem that was not addressed, or a subsystem that was addressed.

Microprogrammed subsystems are designed with the capability to perform diagnostic tests independently of the remainder of the data processing system to which the subsystems are coupled. U.S. Pat. No. 4,019,033 entitled "Control Store Checking System and Method" describes a diagnostic system which verifies that the parity logic associated with each register tested has valid parity. This type of diagnostic tests the parity of each register in turn which receives predetermined data. Also the diagnostic does not force bad parity into the system to assure that the bad parity is detected.

U.S. Pat. No. 3,566,093 entitled "Diagnostic Method and Implementation for Data Processors" describes the use of the parity error signal in a diagnostic routine for signalling erroneous access to a memory location or to provide a distinctive synchronization signal for test equipment while the memory is aided through a loop including locations under test.

U.S. Pat. No. 3,518,413 entitled "Apparatus for Checking the Sequencing of a Data Processing System" describes a diagnostic system in which a count of a number of cycles for a microprogram to reach a particular state is compared with the actual count on the number of cycles it took to reach that state.

U.S. Pat. No. 3,831,148 entitled "Nonexecute Test Apparatus" describes self-testing of a processing system under microinstruction control using parity checking apparatus.

U.S. Pat. No. 4,048,481 entitled "Diagnostic Testing Apparatus and Method" describes apparatus which is operative to condition data recovery to receive blocks of synchronization and data patterns arranged in a predetermined format to simulate data transfer from a peripheral device.

U.S. Pat. No. 4,038,537 entitled "Apparatus for Verifying the Integrity of Information Stored in a Data Processing System Memory" describes apparatus for adding together a column of bits including a parity bit in each bit location of a memory having a plurality of word locations, and comparing each sum with a predetermined parity bit of a parity word in one of the word locations.

It should be understood that the references cited herein are those of which the applicants are aware and are presented to acquaint the reader with the level of skill in the art and may not be the closest reference to the invention. No representation is made that any search has been conducted by the applicants.

OBJECTS OF THE INVENTION

It is a primary object of the invention to provide apparatus for improving the diagnostic testing of the commercial instruction processor.

It is another object of the invention to provide apparatus responsive to a microword to verify the data path between registers at the interface and internally in the commercial instruction processor.

It is still another object of the invention to provide apparatus responsive to a microword for generating "bad" parity for the diagnostic testing of the commercial instruction processor.

SUMMARY OF THE INVENTION

A data processing system includes a cache memory management unit (C/MMU) 12, a central processor unit (CPU) 2, a commercial instruction processor (CIP) 10, and a scientific instruction processor (SIP) 8, all coupled in common to a common bus 16. The CIP 10 includes a control store 60 for storing a plurality of microprograms including a diagnostic microprogram for verifying the data path including internal bus (BI) 100, OP2 register 66-2, output data regiser 80-2, common bus 16, the input data register 80-4, BI bus 100 and OP1 register 64-2. Also verified are the parity logic elements 80-6 and 80-12 associated with the registers as well as a command out register 58-2, a driver 58-4 and a command in register 58-6.

The diagnostic microprogram starts the operation by clearing an 8 bit counter CTR1 88 2 to $00_{16}$ and storing that value in the 4 byte positions of the OP2 register. CTR1 is incremented so that on subsequent passes of the diagnostic program all 256 bit combinations are tested. A mode register 92 generates $\mp$bad" parity. The data path is tested with "bad" parity in each of the 4 byte positions and with good parity in all 4 byte positions.

When the OP2 register is loaded, a microword generates an ELSOLO signal which causes the data stored in the OP2 register to be transferred to the output data register, over the local bus to the input data register. The same word generates other signals which transfer the input data register contents over the BI bus to the OP1 register during the microword cycle. Subsequent microwords compare the contents of the OP1 and OP2 registers as well as the parity bits and cause a branch to an error routine if the results are different than as expected.

BRIEF DESCRIPTION OF THE DRAWINGS

FIG. 2 is a block diagram of the commercial instruction processor 10.

FIG. 3 shows the detailed clock logic 86-1.

FIG. 4 shows the interface register data path logic.

DESCRIPTION OF THE PREFERRED EMBODIMENT

Figure 1:
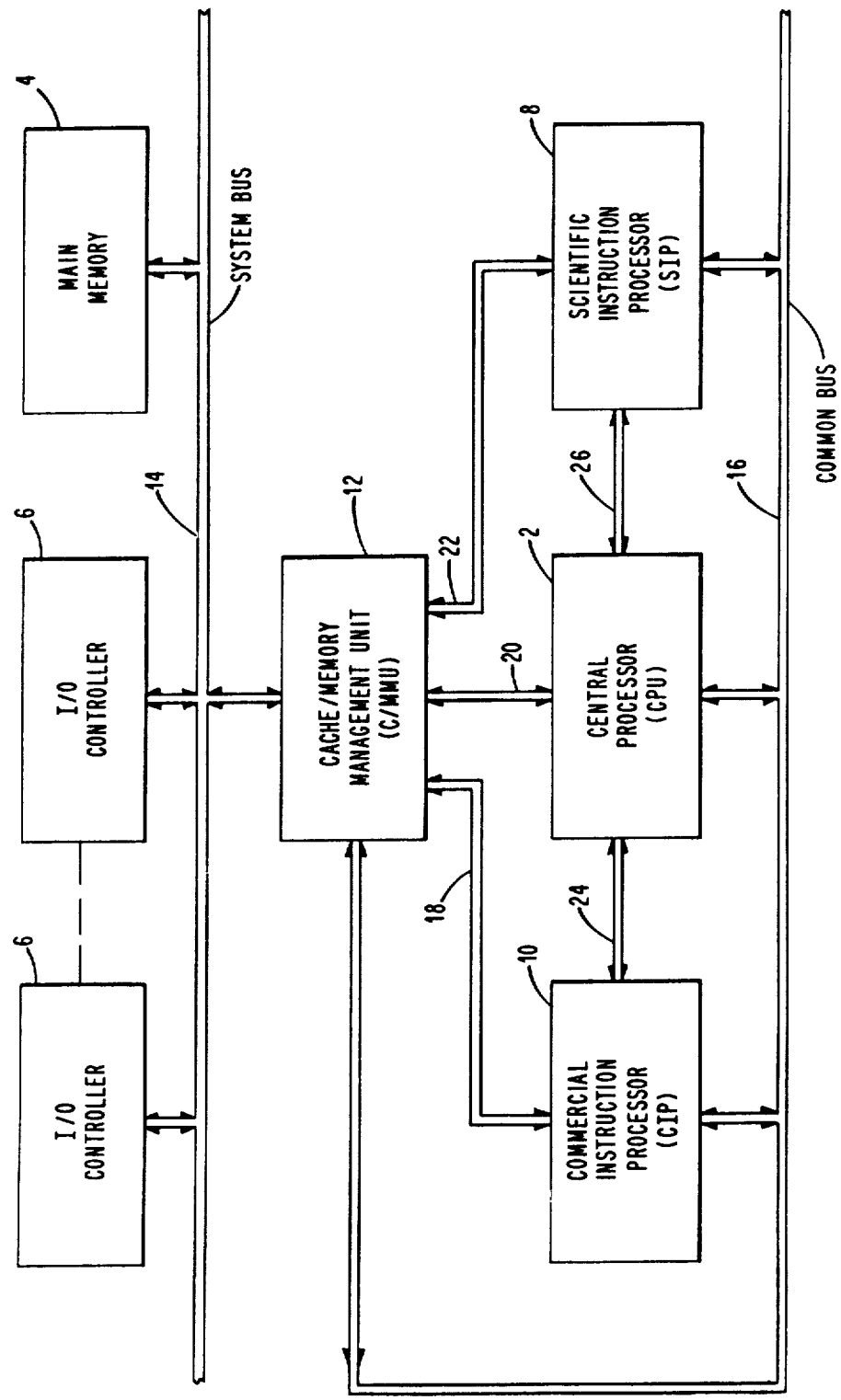
FIG. 1 is a block diagram of the overall data processing system.

FIG. 1 is an overall block diagram of a data processing system which includes a main memory 4, a plurality of input/output controllers 6 and a cache/memory management unit (C/MMU) 12; all coupled in common to a system bus 14. Coupled to the C/MMU 12 are a central processor unit (CPU) 2, a commercial instruction processor (CIP) 10 and a scientific instruction processor (SIP) 8 via buses 20, 18 and 22 respectively. The C/MMU 12, CIP 10, CPU 2 and SIP 8 are coupled in common to a common bus 16. Also, CPU 2 is coupled to the CIP 10 and the SIP 8 via buses 24 and 26 respectively.

The CIP 10 executes a set of instructions designed to facilitate the processing of character strings and decimal data. The SIP 8 executes a set of scientific instructions particularly useful for FORTRAN applications. This set includes arithmetic operations on single and double precision floating point operands and single and double word integer operands.

All instructions in a program under execution are received by CPU 2 from C/MMU 12 via buses 16 and 20. CPU 2 determines from the operation code of the instructions if the instruction is to be processed by the CPU 2, the CIP 10, or the SIP 8. The CPU 2 receives status information from the CIP 10 or SIP 8 over buses 24 and 26 respectively. If the CIP 10 or SIP 8 is available, the CPU 2 sends the necessary information out on common bus 16 and also bus 26 for the SIP 8. The CIP 10 or the SIP 8 processes the instruction and is operative with the C/MMU 12 via bus 18 or 22 respectively and bus 16 for processing the instruction.

The CIP 10 processes instructions which include the following:
1. Decimal arithmetic operations on string and packed numeric data.
2. Alphanumeric and decimal move and compare instructions.
3. Conversion between binary and decimal numeric representation.
4. Edit instructions.
5. Arithmetic shift instructions.

Main memory 4 stores instructions and data and is operative with the C/MMU 12 for the transferring of instructions and data over system bus 14 under control of CPU 2 via bus 20. This operation is described in U.S. Pat. No. 4,030,075.

The C/MMU 12 which includes a cache memory stores the instructions and data currently being processed by the CPU 2, CIP 10 and SIP 8. The cache operation is described in U.S. Pat. No. 4,195,340.

The CPU 2 is also operative for initiating transfers of data between the I/O controllers 6 and main memory 4.

Referring to FIG. 2, all CIP 10 operations except initialization operations from a console are initiated by CPU 2 writing a 6 bit function code into a function code register 96 and a 32 bit double word of data into a portion of a common bus data interface 80 via common bus 16. The CIP 10 when activated transfers the low order 6 bits of the double word into an instruction register 56. If the function code register 96 stores an output task function code $07_{16}$, then the low order 16 bits of the double word are stored in a portion of an addess control unit 82 to allow the CPU 2 to request the previous instruction word at a later time.

The contents of function code register 96 select a firmware word in a control store 60 via control store address logic 58. The firmware word is loaded into a control store data register 62 and conditions CIP 10 to receive additional control information from CPU 2. A control store decode logic 61 generates control signals by decoding the output signals RD 00-67+ from control store data register 62. Signals RD 52-67+ applied to control store addressing logic 58 result in control store 60 branching to a specified address location.

The CIP 10 instructions operate on three data types, decimal strings containing binary coded decimal digits, alphanumeric strings containing ASCII characters and binary numbers having 16 or 32 bit precision. Decimal data operands are referenced by the location of the most significant digit and length and may have one or two digits in a byte. Packed decimal operands store two digits per byte and string decimal operands store one digit per byte.

String decimal operands may be unsigned and assumed positive, may have a leading sign byte placed before the most significant decimal byte, a trailing sign byte placed after the least significant decimal byte or a trailing overpunched sign included with the least significant decimal byte.

Packed decimal operands may be unsigned implying a positive sign or have a trailing sign.

Binary data operands have the most significant binary bit as a sign bit with the binary point assumed to the right of the least significant binary bit using 2's complement notation.

The double words received by CIP 10 from CPU 2 following the instruction word specifying a decimal arithmetic operation indicates the decimal type, string or packed, sign information, the length of the operand and the effective address. This is the address of the byte containing the most significant character (4 or 8 bits/character).

Initially during the processing of a decimal numeric instruction, control store 60 generates signals via control store data register 62 causing the address control unit 82 to send the main memory 4 address of the operand 1 word containing the sign character to C/MMU 12. The operand 1 word containing the sign character is received by common bus data interface 80 and stored in OP1 64 and OP2 66. The sign character is selected by selector 70 for transfer to a sign decode overpunch encode logic 74 where it is decoded into status bits indicating an illegal sign or a negative sign. The control store addressing logic 58 is responsive to the illegal sign status bit and the negative sign status bit. If the sign is legal, then the negative sign status bit is stored in the microprogram status register 94. The operand 2 word containing the sign is processed in a similar manner and stored in OP2 66. Selector 70 transfers the sign character to sign decode overpunch encode logic 74 where it is decoded into the illegal sign or the negative sign and stored in the microprogram status register 94. This allows the CIP 10 to abort the instruction and notify the CPU 2 if an illegal sign was detected.

A decimal add instruction is indicated by an output task function code $07_{16}$ and the instruction register 96 storing hexadecimal $2C_{16}$. During the execution of the decimal add instruction, operand 1 is added to operand 2 and the result of the addition is stored in the location in main memory 4 that stored operand 2.

The CIP 10 waits for the CPU 2 to send the additional control information required for the CIP 10 to execute the decimal add instruction. The additional control information consists of up to 3 double words describing operand 1 and up to 3 double words describing operand 2. The last double word received from the CPU 2 is an output last data descriptor indicated by a function code of $1F_{16}$.

The first of the 3 double words for each operand contains the effective virtual byte address of the operand which indicates the start of the operand in main memory 4, that is, the leftmost or lowest addressed byte containing some of the operand. The second double word may contain an indirect length. The third double word contains the data descriptor which specifies the data type and the position within the initial word received from main memory 4 of the start of the operand. The six double words are stored in the address control unit 82.

The output of instruction register 56 addresses a word in control store 60 to start the CIP 10 execution of the decimal add instruction by sending the main memory 4 address for the low order word of operand 1 containing the least significant decimal digits to the C/MMU 12 via bus 18. The first word of operand 1 is read from main memory 4 or from a cache memory (not shown) in C/MMU 12 and transferred to CIP 10 via common bus 16 and stored in OP1 64. Similarly, the low order word of operand 2 is received by CIP 10 and stored in data scratchpad unit 50 and in OP2 66.

The bit of each data descriptor word describing the characteristics of the two operands (ASCII string or packed) and the computed position of the least significant decimal digit in their respective low order words for operands 1 and 2 are stored in OP1A 84 and OP2A 78 respectively. In addition, the length of operands 1 and 2 is stored in descriptor operand length processing logic 88. The operation of operand length processing logic is described in application Ser. No. 219,809 entitled "A Data Processor Using Read Only Memories for Optimizing Main Memory Access and Identifying the Starting Position of a Operand." The OP1A 84 output is applied to a selector 68 and the OP2A 78 output is applied to a selector 70 for selecting the operand 1 and operand 2 decimal digits as they are transferred from OP1 64 and OP2 66 for processing by a decimal/binary ALU 76, one decimal digit at a time. The resulting decimal digit of the addition is transferred from ALU 76 to OP2 66 via an internal bus (BI) 100, replacing the operand 2 decimal digit that contributed to this result. The operations of OP1A 84 and OP2A 78 are described in application Ser. No. 220,220 entitled "A Data Processor Having Apparatus for Controlling the Selection of Decimal Digits of an Operand When Executing Decimal Arithmetic Instructions" and application Ser. No. 220,219 entitled "A Data Processor Using a Read Only Memory for Selecting a Part of a Register Into Which Data is Written."

OP1A 84 keeps track of the number of decimal digits remaining in OP1 64 from the transfer of the low order word. When the last decimal digit from the low order word is read from OP1 64 to ALU 76, OP1A 84 signals the branching logic in control store addressing logic 58 to address a word in control store 60 which fetches the next word of operand 1 from main memory 4 via C/MMU 12. The address of the next word of operand 1 is sent from address control unit 82 to C/MMU 12 via bus 18.

Similarly, OP2A 78 signals the branching logic in control store addressing logic 58 to enter into a firmware routine to transfer the resulting word of the addition stored in OP2 66 to common bus data interface 80 for transfer to main memory 4 via common bus 16 to C/MMU 12 at the location specified by the address from address control unit 82 over bus 18. A copy of the result is stored in data scratchpad unit 50. A read cycle is initiated to read the next word of operand 2 by sending the next address from address control unit 82 to C/MMU 12 via bus 18.

When the processing of all of the decimal digits from operand 1 or operand 2 is completed, descriptor operand length processing logic 88 controls the filling out of the field of the result in accordance with the remaining decimal digits of the longer operand.

Initially during the multiply instruction execution, the entire multiplicand, operand 2, is transferred from main memory 4 to the data scratchpad unit 50 via common bus data interface 80 and BI bus 100. A multiplier double word of operand 1 is transferred to OP1 64 via common bus data interface 80 and BI bus 100. The least significant multiplier digit is read into a multiply register/counter 52 from OP1 64 via BI bus 100 and is applied to the input address terminals of a multiply programmable read only memory (PROM) 54. Each double word of the multiplicand in turn is transferred to OP1 64 from the data scratchpad 50. Each multiplicand digit in turn is applied to the remaining input address terminals of PROM 54 from OP1 64 via selector 68 to generate the partial product digits. Each partial product digit is applied to ALU 76 via selector 68 where it is added to corresponding decimal digit stored in OP2 66 and the resultant partial product stored back in OP2 66.

The next multiplier digit is read into multiply register/counter 52 and the output applied to PROM 54. Again each multiplicand digit in turn is applied to PROM 54 and the partial product digits are applied to ALU 76 via selector 68 where they are added to the selected partial product digits stored in OP2 66. Here again, OP2A 78 controls selector 70 to select the partial product digit to be applied to ALU 76. The partial product result from ALU 76 is again stored in OP2 66 via BI bus 100.

When all of the multiplicand digits stored in data scratchpad unit 50 have been applied to the input address terminals of PROM 54 along with the most significant multiplier decimal digit output of multiply register/counter 52, the data scratchpad unit 50 contains the product of the multiplication. This product is written into main memory 4 via OP2 66, common bus data interface 80 and common bus 16.

A decimal division instruction is executed by receiving the dividend and divisor in common bus data interface 80 from C/MMU 12 via common bus 16 for storage in the data scratchpad unit 50. Portions of the divisor are stored in OP1 64 in turn and portions of the dividend/partial remainder are stored in OP2 66 in turn. The CIP 10 executes the decimal divide instruction by a series of successive subtractions and counting the number of successful subtractions in an ALQR register/counter 72. A successful subtraction is one in which the result is a positive number.

A CIP indicator register 90 is set by the control signals to indicate the status of CIP 10. Register 90 includes an overflow indicator which is set during decimal operations when the receiving field cannot store all significant digits of the result or a divide by zero is detected. A truncation indicator is set during alphanumeric operations when the receiving field cannot contain all characters of the result. A sign fault indicator is set during decimal operations when a negative result is stored in an unsigned field. A greater-than indicator is set during the execution of certain decimal and alphanumeric instructions when the result is greater than zero for decimal numeric operations or operand 1 is greater than operand 2 for decimal or arithmetic comparisons. A less-than indicator is set during the execution of certain decimal and alphanumeric instructions when the result is less than zero for decimal arithmetic instructions or operand 1 is less than operand 2 for either decimal or alphanumeric comparisons.

A CIP mode register 92 stores an overflow trap mask and a truncation trap mask which are indications of which special action the CIP 10 and CPU 2 should take when the overflow or truncation condition arises. The mode register 92 also generates bad parity to test the CIP 10.

A system clock logic 86 includes a 160 nanosecond four phase clock that provides clock signals to trigger all CIP 10 registers and all test and control flops, stabilize registers after loading, and signify that address, data, control and parity are valid allowing initiation of a local bus cycle. In addition, the system clock logic 86 may be stalled when additional time is required to complete certain CIP 10 functions. The system clock logic 86 generates a BUSY signal over common bus 16 to indicate to CPU 2 that the CIP 10 is not available, receives a DCNCNI+ signal from the C/MMU 12 bus to signal the CIP 10 that data for the CIP 10 is on the common bus 8, generates a REQUEST for use of the common bus 16, and waits for a GRANT from the C/MMU 12.

The microprocessor status register 94 in addition to storing operand sign information also stores an indication if an overflow was detected in executing a decimal numeric instruction, whether an encode or a decode overpunched sign operation is required, and when a decimal add operation is completed.

FIG. 3 shows a portion of the detailed system clock logic 86. A basic clock signal MCLOCK— timing is generated by selecting one or two adjacent output signals CKDL10—, CKDL12—, CKDL14—, CKDL16— or CKDL18— from a delay line 86-2. The signals are selected by a switch 86-4 and applied to a junction 86-6. An output signal CKDLRC— at logic ONE is applied to an input of a NAND gate 86-8 which generates output signal CKDL00— at logical ZERO. This forces the selected output signal of delay line 86-2 to logical ZERO, forcing the output signal CKDLRC— of junction 86-6 to logical ZERO. This forces signal CKDL00— to logical ONE. Signal CKDL00— cycles between logical ONE and logical ZERO thereby generating a free running square wave at a frequency selected by switch 86-4. Note that any one of the stall signals CKSTLA—, CKSTLB— or CKSTLC— at logical ZERO applied to NAND gate 86-8 will stall the basic clock by keeping signal CKDL00— at logical ONE.

Figure 5:
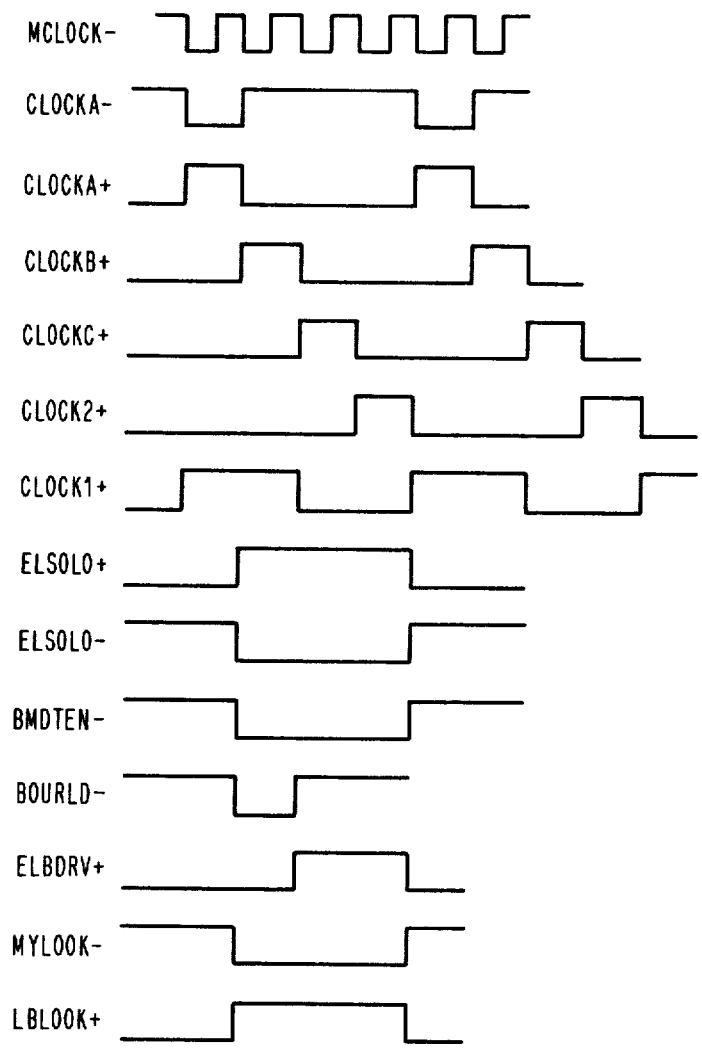
FIG. 5 is a timing diagram of the interface register data transfer.

Signal CKDL00— generates clock signal MCLOCK— through inverters 86-10 and 86-12. The switch positions of switch 86-4 are selected to generate the timing of clock signal MCLOCK— as a 40 nanosecond nominal square wave timing cycle, 20 nanoseconds at logical ONE and 20 nanoseconds at logical ZERO as shown in FIG. 5.

Clock signal MCLOCK— is applied to the clock terminals of flops 86-14, 86-16, 86-18 and 86-20. The timing sequence is started during the master clear operation when the BSMCLR+ signal is received over common bus 16. Flop 86-18 is set and flops 86-20, 86-14 and 86-16 are reset by forcing the clear signal MYMCLR— to logical ZERO via inverters 86-34 and 86-36 and a driver 86-38. The master clear operation also forces signals CKDL00— and CKDLRC— to logical ONE since signal CKSTLB— is forced to logical ZERO via a NOR gate 86-51 and a NAND gate 85-52. Flop 86-18 setting forces output signal CLOCKC+ to logical ONE and output signal CLOCKC— to logical ZERO. At the conclusion of the master clear operation, clear signal MYMCLR— is forced to logical ONE. At the conclusion of the master clear operation, the return of signal MYMCLR— to the logical ONE state causes signal MCLOCK — to fall via gates 86-51, 86-52, 86-8, 86-10 and 86-12. This falling MCLOCK— signal causes flop 86-20 to set and flop 86-18 to reset. Successive falls of clock signal MCLOCK— result in the sequence of successive setting and resetting of flops 86-14, 86-16, 86-18, 86-20, 86-14, etc. as shown in FIG. 5 by the timing of signals CLOCKA+, CLOCKB+, CLOCKC+, CLOCK2+, CLOCKA+, etc. respectively. During non-stall operation, the sequential clock signals CLOCKA+, CLOCKB+, CLOCKC+ and CLOCK2+ are at logical ONE for 40 nanoseconds and at logical ZERO for 120 nanoseconds and provide the basic logic timing for the CIP 10 operation. The transition from signal CLOCK2+ to signal CLOCKA+ identifies the beginning of a control cycle which is the time at which the control store data register 62 is loaded.

The CIP 10 clock is stalled during the following operations:

1. During a system clear operation, signal BSMCLR+ is received via local bus 16. This results in the stall clock signal CKSTLB− from a NOR gate 86-51 being forced to logical ZERO via an inverter 86-34, signal LBMCLR−; an inverter 86-36, signal MYMCLR+; a driver 86-38, signal MYMCLR−; and NOR gate 86-51.

2. During a maintenance operation, signal TBSTAL− at logical ZERO is applied to NOR gate 86-51 forcing stall clock signal CKSTLB− to logical ZERO as above.

3. During an information transfer between main memory 4 and CIP 10, a clock stall flop 86-27 sets on the rise of the CLOCKC+ signal when firmware signal MSTALL− from the control store data register 62 is at logical ZERO. A clock stall signal CKSTL1+ at logical ONE is applied to an AND/NOR gate 86-40, forcing clock stall signal CKSTLC− to logical ZERO. This prevents firmware from attempting to transfer information before it is received by the CIP 10. This stall is also used to keep the firmware from changing the main memory 4 address before the main memory 4 or cache is through using it.

4. During a firmware cycle, control store 60 signal RROS12+ at logical ONE (a common bus request firmware signal) causes flop 86-39 to set on the fall of clock signal CLOCKA−. Output signal CKSTL2+ at logical ONE applied to AND/NOR gate 86-40 forces clock stall signal CKSTLC− to logical ZERO.

5. During the time required for the hardware to change the address of the next control cycle, the error signal BMYERF+ at logical ONE, applied to an AND/NOR gate 86-50, forces clock stall signal CKSTLA− to logical ZERO.

6. During a control cycle when the CIP 10 is not busy, signal CIBUSY− is forced to logical ONE at the beginning of the control cycle. Signal CIBUSY− is applied to the AND/NOR gate 86-50 to force the clock stall signal CKSTLA− to logical ZERO.

The output signal SETCLK− of switch 86-4 which is applied to the control store addressing logic 58, FIG. 2, is used while adjusting the basic timing of CIP 10.

Figure 6:
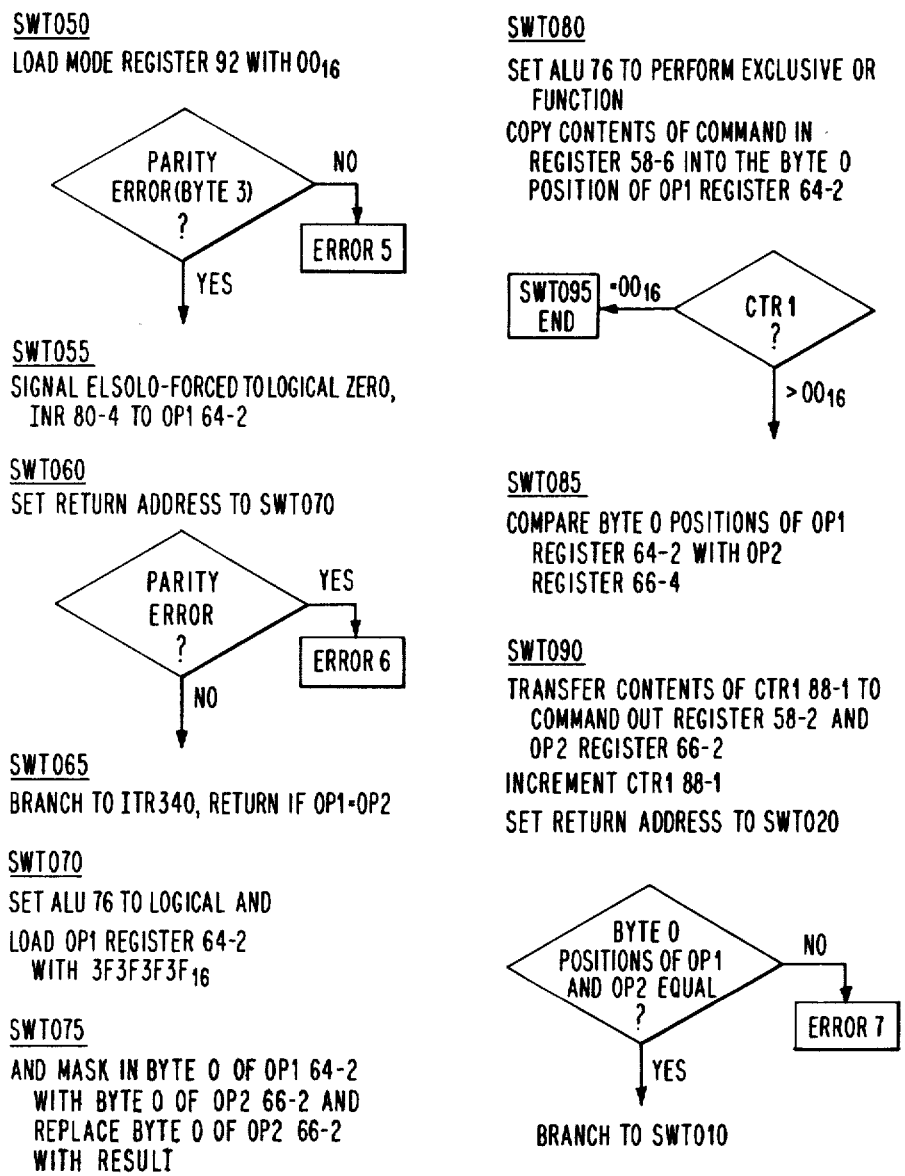
FIG. 6 is a flow diagram showing the firmware steps in performing the short wrap test.

FIG. 4 shows the logic for checking the data path between OP2 66 and the common bus data interface 80 of FIG. 2, including internal bus (BI) 100 and common bus 16. The logic for checking shown in FIG. 4 is controlled by the "short wrap test," a sequence of firmware steps stored in control store 60 which are shown in FIG. 6.

Referring to FIG. 4, a counter CTR1 88-1 was left with a value of zero by a prior test. CTR1 88-1 is controlled by a number of signals from control store decode logic 61. A signal CTR1EN− at logical ZERO enables CTR1 88-1 to be incremented or decremented. A signal CTR1LD− at logical ZERO loads the information on signals BIDT 16-23+ into CRT1 88-1 on the rise of a CLOCK2− clock signal. A signal CTRINC+ at logical ONE, with counter enabled, increments CTR1 88-1 on the rise of the clock signal CLOCK2−. Signal CTRINC+ at logical ZERO, with counter enabled, decrements CTR1 88-1 on the rise of the signal CLOCK2−. The output signals C1R1 0-7+ are loaded into the four byte positions of a register 66-2 of OP2 66 via a MUX 88-3, signals CTBI 0-7+, a MUX 76-11 of decimal/binary ALU 76, and BI bus 100 signals BID1 00-31+. Register 66-2 now stores the contents of CTR1 88-1 in each of the four byte positions byte 0, byte 1, byte 2 and byte 3.

Note that FIG. 2 is an overall block diagram of the CIP 10 and may not show all of the signal paths as shown in FIG. 4.

An ELSOLO− signal is generated by a decoder 61-2 when at least one of the control store data register 62 signals RD 08+, RD 09+, RD 10+ or RD 11+ applied to a NOR gate 61-4 is at logical ONE. The output signal MS12EN− at logical ZERO and signals RD 20+, RD21+, RD 22+ and RD 23+ at logical ONE generate the decoder 61-2 output signal ELSOLO− when the CLOCKA+ signal is at logical ZERO.

The signal ELSOLO− at logical ZERO loads the contents of register 66-2 into an output data register 80-2 via signals OP2D 00-31+, and an input data register 80-4 via local bus 16 signals LBDT 00-31+ from common bus data interface 80. Also a parity generator 80-6 generates four parity signals OUDP 00+ (byte 0), OUDP 08+ (byte 1), OUDP 16+ (byte 2), and OUDP 24+ (byte 3) from signals OP2D 00-31+. The four parity signals, one for each of the four bytes of information stored in register 66-2, are stored in a register 80-8 and via local bus 16 signals LBDP 00,08,16,24+, also stored in a register 80-10. The output signals of register 80-10, four parity signals INDP 00,08,16,24+, are applied to a parity (checker) generator 80-12 together with the corresponding four bytes of information INRX 00-31+. If any of the bytes including the parity bit has an even number of ONE bits, then its corresponding parity signal IDBPE 0-3+ is at logical ONE and is applied to parity error logic 86-3 of system clock logic 86 to call for an error firmware routine.

The ELSOLO− signal generates a number of clock and control signals for loading the registers. The ELSOLO− signal is applied to an inverter 86-20 to generate an ELSOLO+ signal which is applied to the input of an AND/NOR gate 80-16. The output signal, load signal BOURLD−, is conditioned to load registers 80-2 and 80-8 on the fall of the CLOCKB+ signal applied to AND/NOR gate 80-16.

Signal ELSOLO+ is applied to inputs of AND/NOR gate 80-18. The output signal BMDTEN− conditions the registers 80-2 and 80-8 to place their data on the common bus 16 when the clock signal CLOCKA− is at logical ONE. The enable timing was constrained by two considerations:

1. The registers 80-2 and 80-8 were implemented with devices which could fail to capture data if the clock signal CLOCKA− and the enable signal BMDTEN− were applied simultaneously.

2. The data must be on the common bus 16 during the time the registers 80-4 and 80-10 are enabled.

Signal ELSOLO− at logical ZERO applied to a negative AND gate 80-22 generates signal MYLOOK− at logical ZERO when the CLOCKA+ signal is at logical ZERO. Signal MYLOOK− at logical ZERO is applied to a NOR/AND gate 80-24 which generates a signal LBLOOK+ at logical ONE. Signal LBLOOK+ at logical ONE is applied to the G (gate) input of registers 80-4 and 80-10 to copy the output of registers 80-2 and 80-8 respectively.

Command codes generated onto BI bus 100 signals BIDT 02-07+ are stored in a command out register 58-2 on the rise of a signal CICMDL− from control store decode logic 61. These command codes specify input/output activities between the CIP 10 and the CPU 2. The output signals CICMD 3-8+ are applied to a driver 58-4. An ELBDRV+ signal is generated by a NOR/AND gate 58-8 when signals ELSOLO− and CLOCK1+ are at logical ZERO to drive signals CICMD 3-8+ over local bus 16 signals LBCMD 3-8+ for storage in an in command register 58-6 when signal LBLOOK+ is at logical ONE. The output signals INCMD 3-8+ are applied to the address control unit 82 and the MUX 76-11 for storage in OP1 register 64-2.

The mode register 92 generates even parity signals GNEVP 0-3+ to force bad parity into byte positions 0 through 3 of signals OP2D 00-31+ read from OP2 register 66-2; and a bypass parity signal BYPSER− which prevents the CIP 10 from entering its normal parity error control sequence.

A counter CTR2 88-2 contains one less than the number of bytes to be compared by the "ITR" compare subroutine. A MUX 88-3 selects the output of CTR1 88-1 or CTR2 88-2, signals CTR1 0-7+ or CTR2 0-7+ respectively, to be applied to MUX 76-11 as signals CTBI 0-7+. The MUX 88-3 selection is controlled by signals RD 11+ and RD 12+ from the control store data register 62. CTR2 88-2 is controlled by load signal CTR2LD−, enable signal CTR2EN− and the increment signal CTRINC+ from control store decode logic 61. MUX 88-3 selects constants from control store data register 61, signals RD 16-23+, through terminal 0.

A request grant signal RQGTCI− is received over bus 18 by an inverter 86-29 which generates an RQGTCI+ signal. Request grant signal RQGTCI− applied to a NOR/AND gate 58-8 and signal RQGTCI+ applied to an AND/NOR gate 80-18 are active during normal common bus operation. The OURLDE+ signal restricts the loading of the output registers 80-2 and 80-8 under firmware control during normal operation to write requests. The DCNNCI+ signal from bus 18 during normal operations controls the loading of registers 80-4 and 80-10 of information received from main memory 4 or cache (not shown).

FIG. 5 is a timing diagram of the firmware control by the ELSOLO− signal. As shown in FIG. 3, the basic clock signal MCLOCK− applied to flops 86-14, 86-16, 86-18, 86-19 and 86-20 generates clock signals CLOCKA−, CLOCKA+, CLOCKB+, CLOCKC+, CLOCK2+ and CLOCK1+. The ELSOLO− signal is generated by a firmware decode when signal CLOCKA+ is low. Signal ELSOLO+ is the inverted ELSOLO− signal. The BMDTEN− signal is forced low when signals CLOCKA− and ELSOLO+ are high, i.e., during clocks B, C and 2 of the control cycle asserting ELSOLO. The BOURLD− signal is low when signals ELSOLO+ and CLOCKB+ are high; therefore, the output register is loaded at the end of clock B. The ELBDRV+ signal is high when signals ELSOLO− and CLOCK1+ are low; therefore, the command out bits (from 58-2) are enabled onto the common bus command signals LBCMD 3-8+ during CLOCKC and CLOCK2 time.

The MYLOOK− signal is low and the LBLOOK+ signal is high when signals CLOCKA+ and ELSOLO− are low, so that whatever is on common bus 16 data/parity bits LBDT 00-31+, LBDP xx+ and on common bus control signals LBCMD 3-8+ pass through and are latched into input registers 80-4, 80-10 and 58-6.

FIG. 6 shows the short wrap test firmware routine for checking the various data paths. This test generates 256 data patterns, it forces and detects bad parity for each of the four bytes in the double word data paths for each data pattern, sends and detects each pattern with good parity, and sends and receives all patterns of 6 bits of data through the command registers 58-2 and 58-6.

Block SWT 005 shows the transfer of a byte having a value of $00_{16}$ from CTR1 88-1 to MUX 76-11 where it is expanded to four bytes $00000000_{16}$ for storage in OP2 register 66-2 via signals BIDT 00-31+ and for storage in the command out register 58-2 as $00_{16}$. CTR1 88-1 is incremented to $01_{16}$ by signal CTR1EN− being forced to logical ZERO and signal CTRINC+ being forced to logical ONE. CTR1 88-1 will generate 256 bit patterns to allow for the testing of each bit data path. The firmware sets the microsubroutine return register to the address of SWT 020.

Block SWT 010 transfers the constant $10_{16}$ from control store 60 via control store data register 62, MUX 88-3, MUX 76-11, and BI bus 100 to mode register 92 thereby forcing signal GNEVP 0+ to logical ONE which generates bad parity in byte 0, good parity on bytes 1, 2, and 3, and forcing the bypass error signal BYPSER− to logical ZERO.

Block SWT 015 generates signal ELSOLO− at logical ZERO to load the output of OP2 register 66-2 into registers 80-2 and 80-4. The output of the input data register 80-4 is copied into OP1 64-2 via MUX 76-11 and internal bus BI 100. The four parity bits OUDP 00,08,16,24+ are loaded into registers 80-8 and 80-10 by signal ELSOLO−. The parity generator/checker 80-12 should detect the bad parity forced on OUDP 00+ and copied into INDP 00+ and raise IDBPE 0+ to a logical ONE.

Block ITR 340 sets up decimal/binary ALU 76, FIG. 2, to perform a compare operation. CTR2 88-2 is loaded with the constant $03_{16}$ from control store 60 via register 62, MUX 88-3, MUX 76-11 and bus BI 100. This indicates that all four bytes are to be compared. Since prior tests have left pointer registers OP1A 84 and OP2A 78 at a value of 1, byte positions zero will be compared first.

Block ITR 345 compares byte 0 of OP1 register 64-2 and OP2 register 66-2 and increments OP1A 84 and OP2A 78 to point to byte 2.

Block ITR 350 transfers to an error firmware sequence ERROR1 if the bytes of OP1 register 64-2 and OP2 register 66-2 just tested are not equal and branches to ITR 355 if there is an equal comparison.

Block ITR 355 compares the next bytes of OP1A 84 and OP2A 78 in turn; tests CTR2 88-2 for $00_{16}$; decrements CTR2 88-2 to $02_{16}$, then $01_{16}$, $00_{16}$, and $FF_{16}$; increments OP1A 84 and OP2A 78 to point to byte 2, then byte 3, byte 1 and finally byte 2; and branches to ITR 350 if the CTR2 test was not equal to $00_{16}$.

Block ITR 360 increments CTR2 88-2 to restore $00_{16}$, decrements OP1A 84 and OP2A 78 to point to byte 0, and returns to the location in the return register SWT 020.

Block SWT 020 loads the mode register 92 with the constant $20_{16}$. This forces bad parity into byte 1 of the output of OP2 register 66-2 signals OP2D 00-31+ by forcing signal GNEVP 1+ to logical ONE. Also the bypass error signal BYPSER— is forced to logical ZERO to suppress the normal error processing. The firmware tests parity error signals IDBPE 0-3+. The firmware initiates a branch to error firmware routine ERROR2 if no error is sensed. Presumably if a parity error was sensed, it was the byte 0 parity error forced previously.

Block SWT 025 generates the ELSOLO— signal at logical ZERO to load the output of OP2 register 66-2 into registers 80-2 and 80-4. Also signals OUDP 08+, LBDP 08+ and IDPE 1+ should be at logical ONE indicating a parity error in byte 1.

Block SWT 030 loads the mode register 92 with the constant $40_{16}$. This forces bad parity into byte 2 of the output of OP2 register 66-2 signals OP2D 00-31+ by forcing signal GNEVP 2+ to logical ONE. Also the bypass error signal BYPSER— signal is forced to logical ZERO. Again the firmware test is made of signals IDBPE 0-3+ for bad parity, presumably in byte 1, branching to error firmware routine ERROR3 if no error is indicated.

Block SWT 035 generates the ELSOLO— signal to affect the register load as described supra. The output of the input data register 80-4 is copied into OP1 register 64-2 via MUX 76-11 and internal bus BI 100. The four parity bits OUDP 00,08,16,24+ are loaded into registers 80-8 and 80-10 by signal ELSOLO—. The parity generator/checker 80-12 should detect the bad parity forced on OUDP 16+ and copied into LBDP 16+ and raise IDBPE 2+ to a logical ONE.

Block SWT 040 loads the mode register 92 with the constant $80_{16}$ forcing signal GNEVP 3+ to logical ONE and the bypass error signal BYPSER— to logical ZERO. This forces bad parity into byte 3. The firmware test is made of signals IDBPE 0-3+ for bad parity, presumably byte 2, branching to the firmware error routine ERROR4 if no error is indicated.

Block SWT 045 generates the ELSOLO— signal to affect the register load as described supra. The output of the input data register 80-4 is copied into register 64-2 via MUX 76-11 and internal bus BI 100. The four parity bits OUDP 00,08,16,24+ are loaded into registers 80-8 and 80-10 by signal ELSOLO—. The parity generator/checker 80-12 should detect the bad parity forced on OUDP 24+ and copied into LBDP 24+ and raise IDBPE 0+ to a logical ONE.

Block SWT 050 loads the mode register 92 with $00_{16}$ to generate the bypass error signal BYPSER— at logical ZERO and allows all bytes to generate good parity. The firmware test is made of signals IDBPE 0-3+ for bad parity, presumably byte 3, branching to the firmware error routine ERROR5 if the error is missing.

Block SWT 055 generates signal ELSOLO— at logical ZERO to load the registers as described supra. In this case, registers 80-8 and 80-10 should contain good parity; that is, signals IDBPE 0-3+ are all at logical ZERO.

Block SWT 060 sets the return address to SWT 070 and branches to a firmware error routine ERROR6 if a parity error is sensed.

Block SWT 065 branches to ITR 340 to compare the contents of OP2 register 66-2 and OP1 register 64-2 to once again verify valid data copying.

The firmware initiates the ITR 340, ITR 345, ITR 350, ITR 355, and ITR 360 steps as described supra and returns to SWT 070.

Block SWT 070 sets ALU 76 to perform a logical AND function and loads OP1 register 64-2 with the constant $3F3F3F3F_{16}$.

Block SWT 075 AND's the $3F_{16}$ from the byte 0 position of OP1 register 64-2 with the data pattern ($00_{16}$ the first time) in OP2 byte 0. The result is written into the byte 0 position of OP2 register 66-2.

Block SWT 080 sets ALU 76 to perform a logical OR function and transfers the contents of the command in register 58-6 into the byte 0 position of the OP1 register 64-2. The contents of the command out register 58-2 were loaded into the command in register 58-6 on each firmware step in which the ELSOLO— signal was at logical ZERO. The contents of CTR1 88-1 are tested for $00_{16}$, indicating that the 256 test patterns were processed to branch to SWT 095 to conclude the short wrap test firmware routine.

Block SWT 085 compares the byte 0 positions of the OP1 register 64-2 and the OP2 register 66-2.

Block SWT 090 transfers the contents of CTR1 88-1 to the OP2 register 66-2 and the command out register 58-2, increments CTR1 88-1 and sets the return address to SWT 020. If the result of the comparison test indicates that bytes 0 of OP1 register 64-2 and OP2 register 66-2 are not equal, then the firmware branches to the error firmware routine ERROR7. If the result of the comparison test indicates equals, then the firmware branches to SWT 010.

Having shown and described a preferred embodiment of the invention, those skilled in the art will realize that many variations and modifications may be made to affect the described invention and still be within the scope of the claimed invention. Thus, many of the elements indicated above may be altered or replaced by different elements which will provide the same result and fall within the spirit of the claimed invention. It is the intention, therefore, to limit the invention only as indicated by the scope of the claims.

What is claimed is:

1. A data processing system includes a memory subsystem for storing a plurality of instructions and operands and a commercial instruction processor (CIP) coupled in common with said memory subsystem to a common bus, said CIP including apparatus for verifying the data interface between said CIP and said common bus, said apparatus comprising:

third register means coupled to said common bus for receiving and storing signals, indicative of said plurality of instructions; control store means including an instruction register coupled to said third register means for storing said signals, said control store means including storing means for storing a plurality of diagnostic microprograms, said control store means including addressing means coupled to said instruction register responsive to said signals for addressing said storing means for reading out a plurality of diagnostic microword signals, said control store means including decoding means responsive to a first plurality of diagnostic microword signals for generating a diagnostic signal; counter means for generating a sequence of data byte signals in response to second diagnostic microword signals of said diagnostic microprogram received from said control store means;

first register means coupled to said counter means for storing each of said sequence of said data byte signals in a predetermined number of byte positions in response to third diagnostic microword signals of said diagnostic microprogram received from said control store means and generating first signals representative of said predetermined number of data bytes;

second register means responsive to said diagnostic signal for storing said first signals and generating second signals representative of said predetermined number of data bytes;

said common bus coupled to said second register means for transmitting said signals;

said third register means coupled to said common bus and responsive to said diagnostic signal for storing said second signals and generating third signals representative of said predetermined number of data bytes;

fourth register means responsive to fourth diagnostic microword signals received from said control store means for storing said third signals and generating fourth signals representative of said predetermined number of data bytes; and comparing means for comparing said first signals and said fourth signals for equals in response to fifth diagnostic microword signals of said diagnostic microprogram received from said control store means thereby verifying the data interface between said CIP and said common bus.

2. The system of claim 1 wherein said CIP further comprises:

parity generating means responsive to said first signals for generating said predetermined number of first parity signals; and parity checking means responsive to said third signals and said predetermined number of said first parity signals for generating said predetermined number of second parity signals respectively.

3. The system of claim 2 wherein said apparatus further comprises:

bad parity generating means coupled to said control store means for generating said predetermined number of bad parity signals, said bad parity generating means being responsive to signals representative of a sixth diagnostic microword signal for generating one of said bad parity signals in a first state, said parity generating means being responsive to said one of said bad parity signals in a first state and said first signals respectively for generating one of said first parity signals;

said parity checking means being responsive to said third signals and said one of said first parity signals for generating a second parity signal in a first state indicative of a data byte having bad parity.

4. The system of claim 3 wherein said control store means comprises:

read only memory means having a plurality of address locations for storing said plurality of diagnostic microprograms;

addressing means for addressing said plurality of address locations;

control store register means for storing signals representative of each of said plurality of diagnostic microprograms from said address location indicated by said addressing means; and said decoding means responsive to said first plurality of diagnostic microword signals for generating said diagnostic signal.

5. The system of claim 4 wherein said counter means comprises:

a counter responsive to said second diagnostic microword signals for generating said sequence of data byte signals having a hexadecimal value from $00_{16}$ through $FF_{16}$.

6. The system of claim 5 wherein said first register means comprises:

a first register responsive to said third diagnostic microword signals for storing each of said sequence of said data byte signals in said predetermined number of byte positions wherein said predetermined number is four, and wherein said first signals are representative of four data bytes of equal value.

7. The system of claim 6 wherein said second register means comprises:

first enabling means responsive to said diagnostic signal, a first clock signal in a first state and a second clock signal for generating first enabling signals; and a second register responsive to said first enabling signals for storing said first signals and generating said second signals.

8. The system of claim 7 wherein said third register means comprises:

second enabling means responsive to said diagnostic signal and said first clock signal in a second state for generating a second enabling signal; and a third register responsive to said second enabling signal for storing said second signals and generating said third signals.

9. The system of claim 8 wherein said fourth register means comprises:

third enabling means responsive to said first microword signals and a third clock signal for generating third enabling signals; and a fourth register responsive to said third enabling signals for storing said third signals and generating said fourth signals.

10. The system of claim 9 wherein said parity generating means comprises:

four first parity generators, each responsive to one of said four equal data bytes of said first signals for generating four of said first parity signals; and a fifth register responsive to said first enabling signals for storing said four first parity signals.

11. The system of claim 10 wherein said parity checking means comprises:

a sixth register coupled to said fifth register and responsive to said second enabling signal for storing said four first parity signals and generating four third parity signals respectively; and four second parity generators, each responsive to one of said four equal data bytes of said third signals and each of said four of said third parity signals for generating four of said second parity signals respectively.

12. The system of claim 11 wherein said bad parity generating means comprises:

a seventh register responsive to said fifth microword signals for generating said one of said bad parity signals in said second state;

one of said first parity generators being responsive to said one of said bad parity signals and said one of said four equal data bytes of said first signals respectively for generating said one of said first parity signals for storage in said fifth register.

13. The system of claim 12 wherein said sixth register stores said one of said first parity signals and generates a one of said third parity signals;
   one of said second parity generators being responsive to one of said four equal data bytes of said third signals and said one of said third parity signals respectively for generating a one of said second parity signals in a first state indicative of bad parity.

14. Apparatus for verifying the data interface of a commercial instruction processor coupled to a common bus in a data processing system, comprising:
   control means for generating a diagnostic signal and a plurality of control signals during a cycle of operation;
   means for generating responsive to said plurality of control signals for generating a sequence of data byte signals for transfer onto said common bus;
   first register means coupled to said common bus and responsive to said diagnostic signal for storing one of said sequence of said data byte signals and generating first data byte signals during said cycle of operation for transfer onto a local bus;
   second register means coupled to said local bus and responsive to said diagnostic signal for storing said first data byte signals and generating second data byte signals during said cycle of operation; and
   means coupled to said first and said second registers for comparing said first and said second data byte signals for equals.

15. The apparatus of claim 14 further comprising:
   parity generating means responsive to said first data byte signals for generating first parity signals during said cycle of operation; and
   parity checking means responsive to said first parity signals and said first data byte signals for generating second parity signals in a first state indicating good parity during said cycle of operation.

16. The apparatus of claim 15 further comprising:
   bad parity generating means for generating bad parity signals,
   said parity generating means being responsive to one of said bad parity signals and said first data byte signals for generating said first parity signals during said cycle of operation,
   said parity checking means generating one of said second parity signals in a second state indicating bad parity during said cycle of operation.

17. The apparatus of claim 16 wherein said control means includes next address means responsive to said second parity signals in said first state for indicating an error condition when said one of said bad parity signals is generated.

18. The apparatus of claim 17 wherein said next address means is responsive to said one of said second parity signals in said second state for indicating an error condition when none of said bad parity signals is generated.

19. The apparatus of claim 18 wherein said control means comprises:
   read only memory means for storing microprograms, including a diagnostic microprogram, having a plurality of address locations for storing a plurality of diagnostic microprograms;
   addressing means for addressing said plurality of address locations;
   control store register means for storing signals representative of each of said plurality of diagnostic microprograms from said address location indicated by said addressing means; and
   decoding means responsive to signals from a first plurality of diagnostic microword signals for generating said diagnostic signal;
   said addressing means being responsive to said second parity signals for branching to an error microprogram address location when an error condition is indicated.

* * * * *